Figure 1:
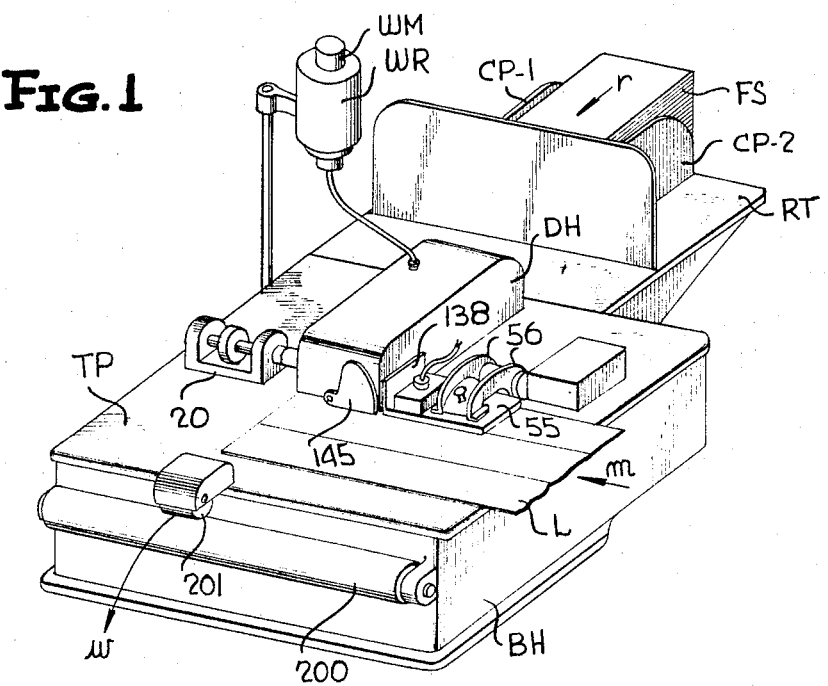

INVENTOR
KURT R. SCHNEIDER

Sept. 20, 1966     K. R. SCHNEIDER     3,273,436
SHEET FEEDING APPARATUS
Filed Feb. 7, 1964     8 Sheets-Sheet 2

INVENTOR
KURT R. SCHNEIDER

ATTORNEYS

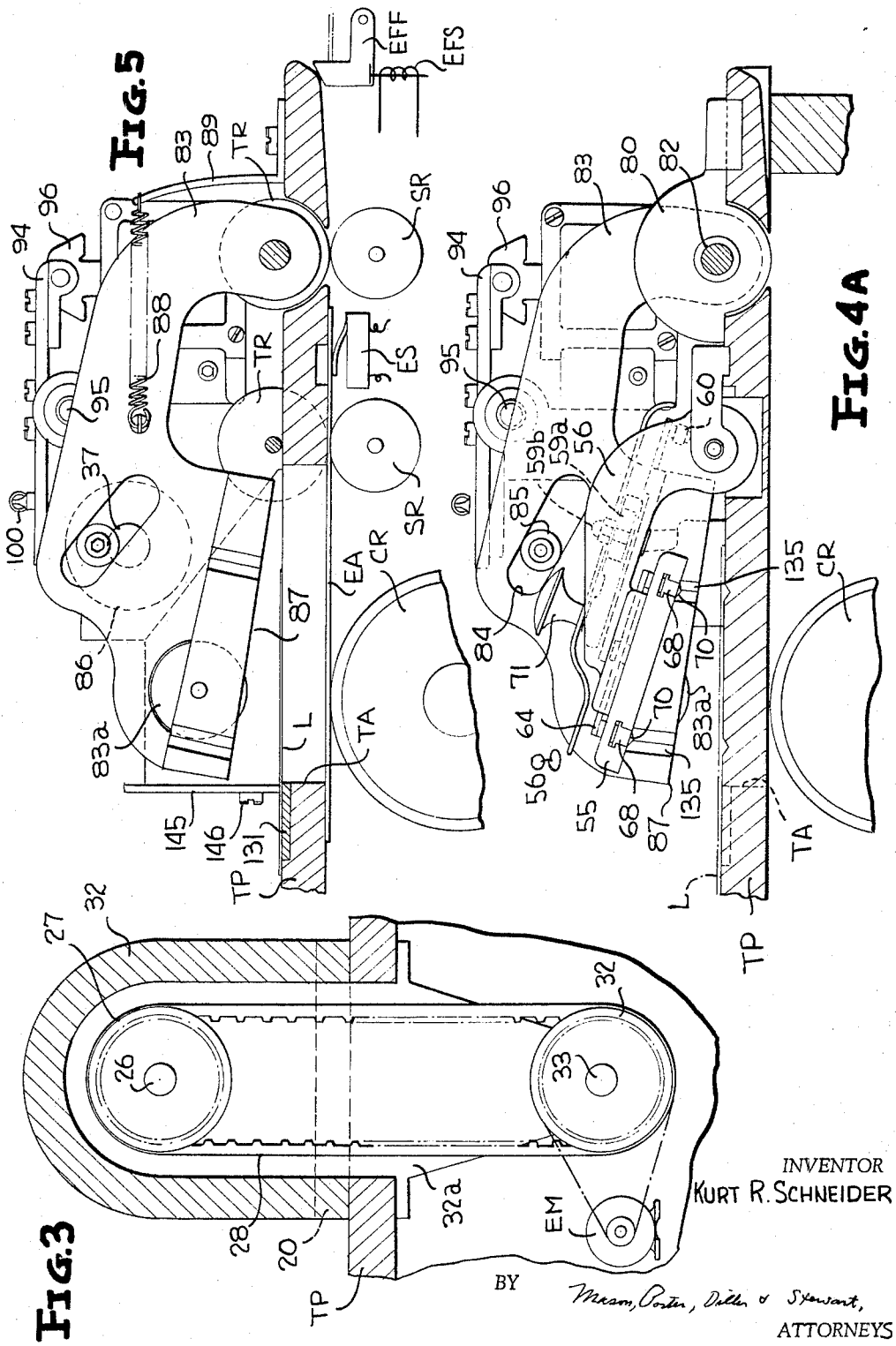

Sept. 20, 1966 K. R. SCHNEIDER 3,273,436
SHEET FEEDING APPARATUS
Filed Feb. 7, 1964 8 Sheets-Sheet 4
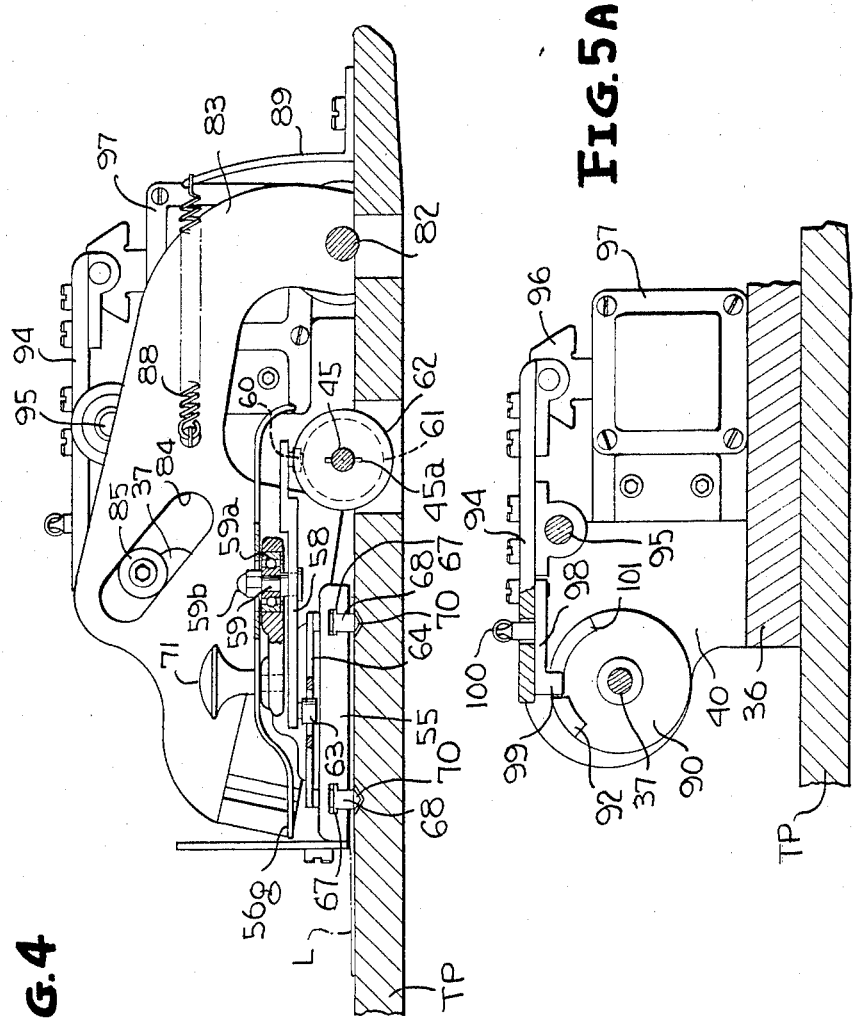
INVENTOR
KURT R. SCHNEIDER
BY Mason, Porter, Diller & Stewart
ATTORNEYS

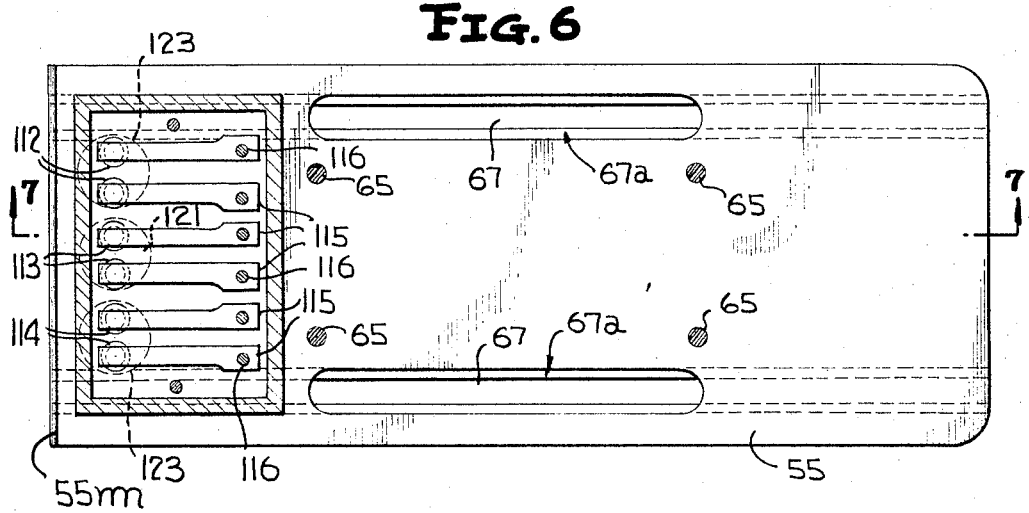
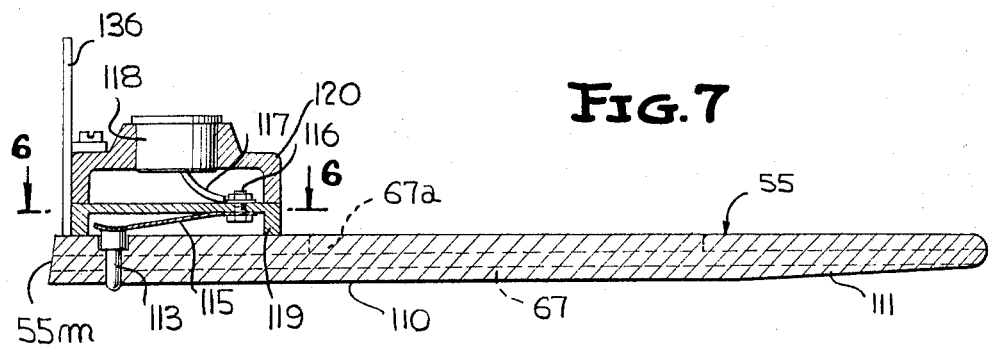
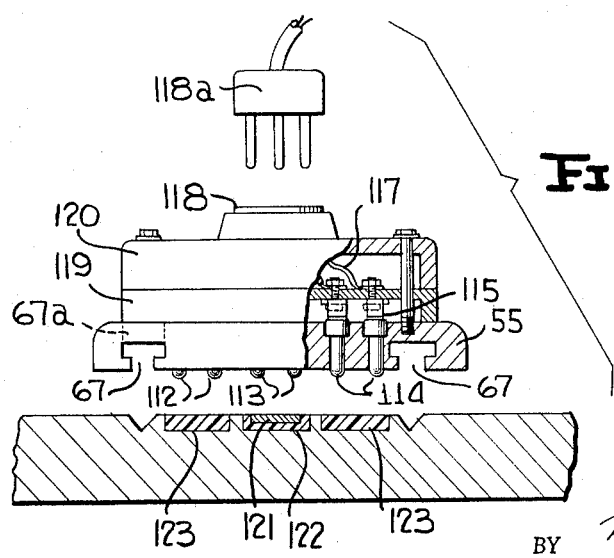

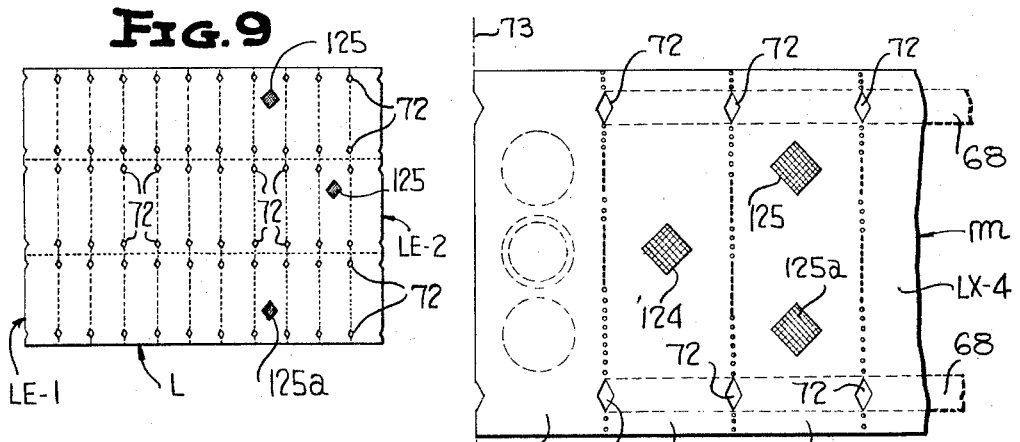
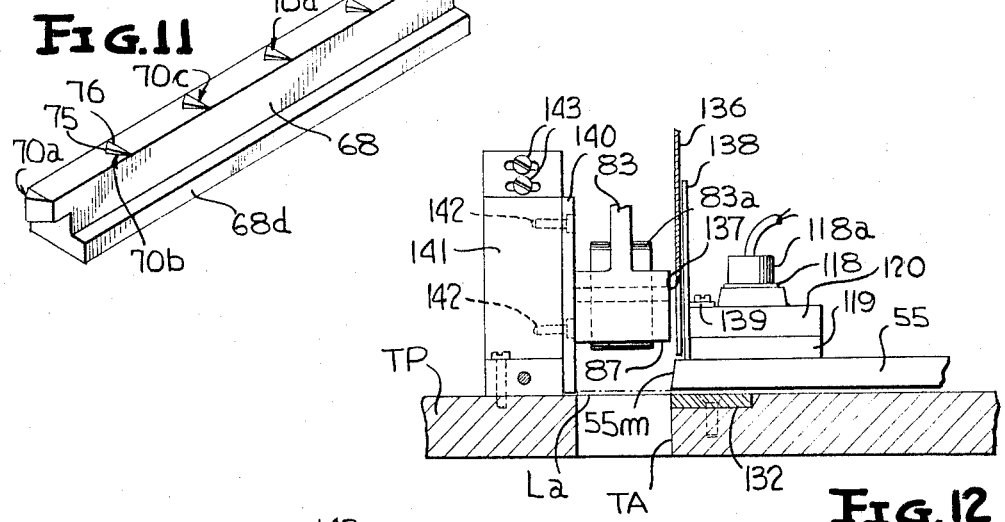
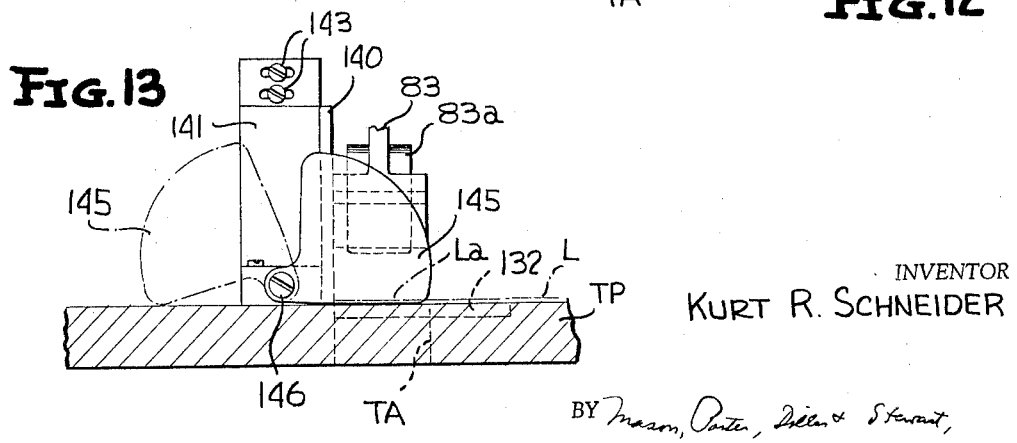
INVENTOR
KURT R. SCHNEIDER
ATTORNEYS

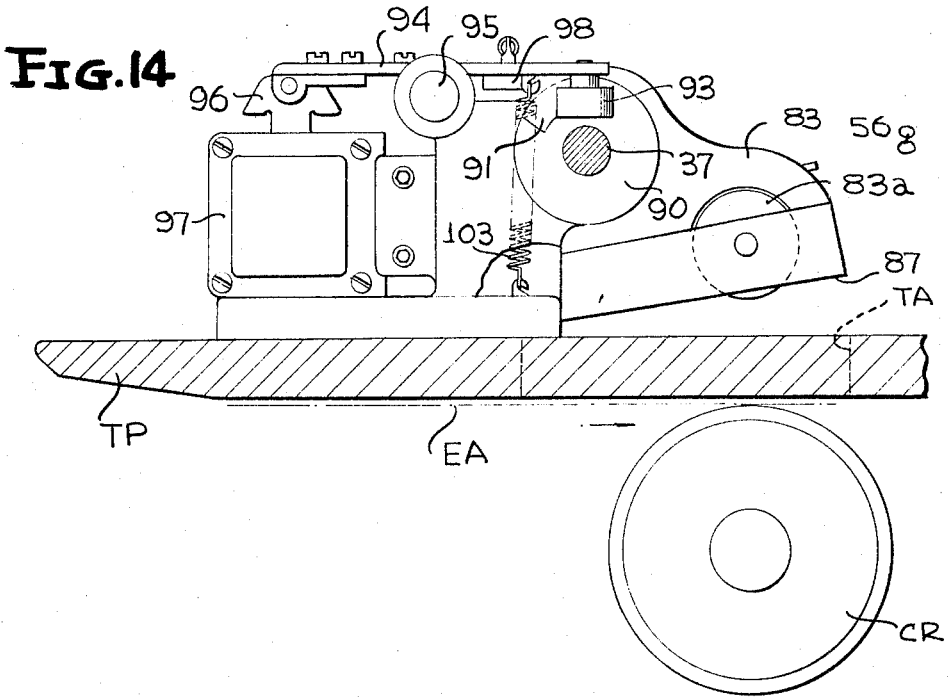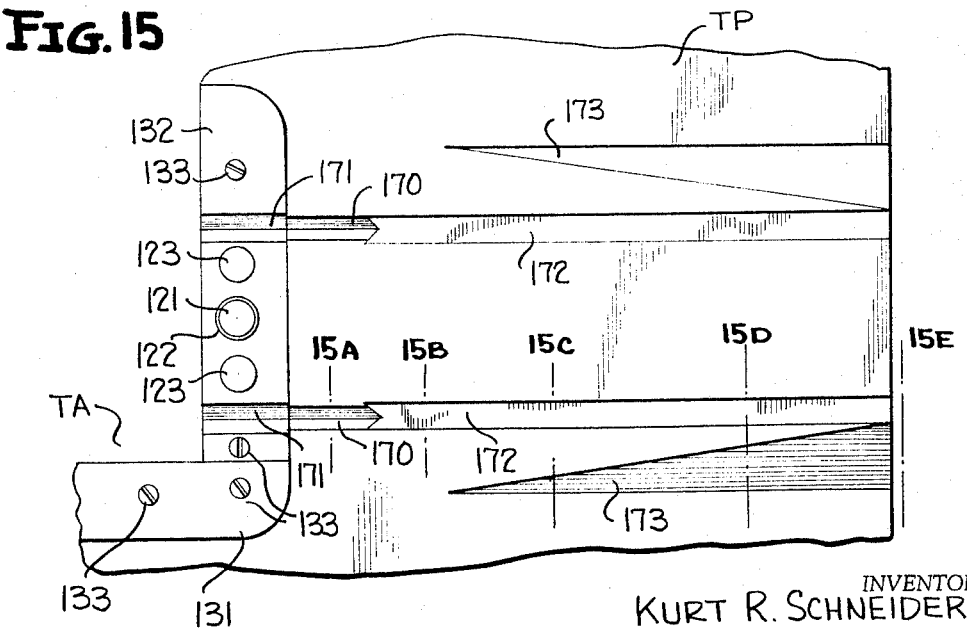

Sept. 20, 1966  K. R. SCHNEIDER  3,273,436
SHEET FEEDING APPARATUS
Filed Feb. 7, 1964  8 Sheets-Sheet 8

INVENTOR
KURT R. SCHNEIDER

BY Mason, Porter, Diller & Stewart,
ATTORNEYS

United States Patent Office 3,273,436
Patented Sept. 20, 1966

3,273,436
SHEET FEEDING APPARATUS
Kurt Rudolf Schneider, Bainbridge, N.Y., assignor to Eureka Specialty Printing Company, Scranton, Pa., a corporation of Delaware
Filed Feb. 7, 1964, Ser. No. 343,408
29 Claims. (Cl. 83—241)

This invention relates to an apparatus by which a sheet may be sequentially fed when predetermined conditions have been met whereby such feeding is proper.

In my Patent 2,754,022 is shown and described an apparatus in which articles and labels are fed, and a label is delivered to each article during the course of its advancement. Other U.S. patents on apparatus useful for such purposes are 2,907,567 and 3,026,236.

An object of this invention is to provide a sheet feeding apparatus including a plate along which the sheets are fed, sheet controlling and feeding devices on a structure rockable about an axis relative to the plate, and intermittently operated devices for effecting the sheet feeding, said feeding devices including reciprocating feed elements carried by the structure and a rocker element on the structure for moving the feed elements.

Another object of this invention is to provide a label feeding and delivering mechanism, including an oscillating pivoted punch and knife device for severing and applying labels to passing articles.

Another object is to provide a knife mounting for determining the position of a sheet cutting knife during its cutting movement.

Another object is to provide means for controlling a multi-column label sheet while individual labels are being taken from a first column thereof, including control during delivery of the last label in the column.

An object is to provide means for controlling a sheet, regardless of the curled or embossed condition thereof, and for accurately advancing the sheet for severing and delivery of sections therefrom.

Another object is to provide means for controlling a sheet, regardless of normal shrinkage or expansion of the paper stock prior to or after the placing of indicia thereon, and for accurately advancing the sheet for severing and delivery of sections therefrom.

Another object is to provide means for advancing a sheet by reciprocating devices engageable in perforations in the sheet, with such devices so constructed and arranged that curling and normal dimensional change of the sheet does not prevent or restrict the proper advancement of the sheet.

Another object is to provide means for controlling and advancing a label sheet by reciprocating devices, wherein the structure prevents retrograde movement of the label sheet during return strokes of the devices and effects regular forward movement during the feeding strokes of the devices.

A further object is the provision of label feeding and delivering mechanism, including reciprocating sheet feeding devices located above the sheet being fed and gravitationally urged into engagement with the sheet.

A further object is to provide an apparatus for feeding a sheet and including a support having grooves, and an overlying plate with sheet feeding means thereon, the feeding means being vertically movable under the opposed forces of gravity and the sheet whereby the feeding means are effective regardless of a curled condition of the sheet.

A further object is the provision of label feeding and delivering mechanism, including a pivotally mounted label plate having label moving and label sensing devices thereon, and an intermittently driven shaft connection for actuating label moving devices, a pivotally mounted knife for severing labels and connected for actuation by said shaft, and means for driving the shaft including a clutch and controls for engaging and disengaging the clutch and for transiently detaining the shaft in a predetermined initial position.

Figure 2A:
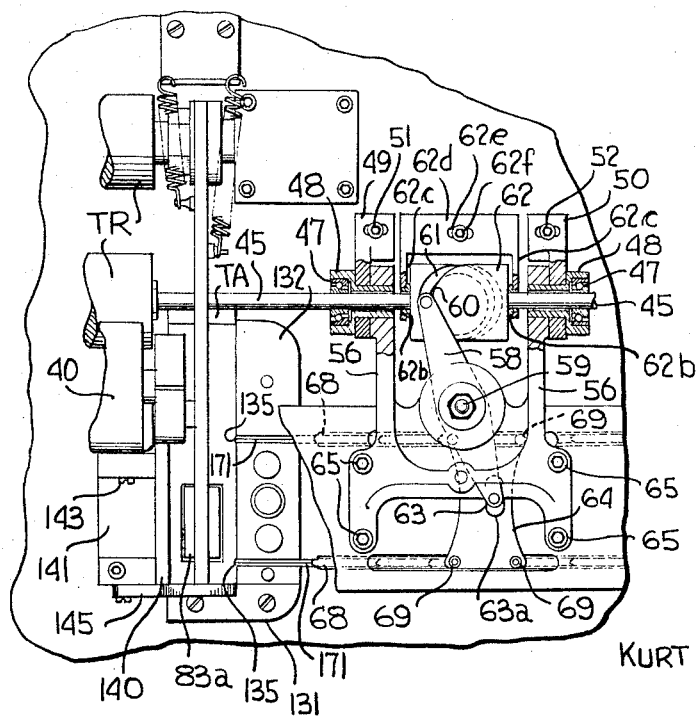
Figure 2:
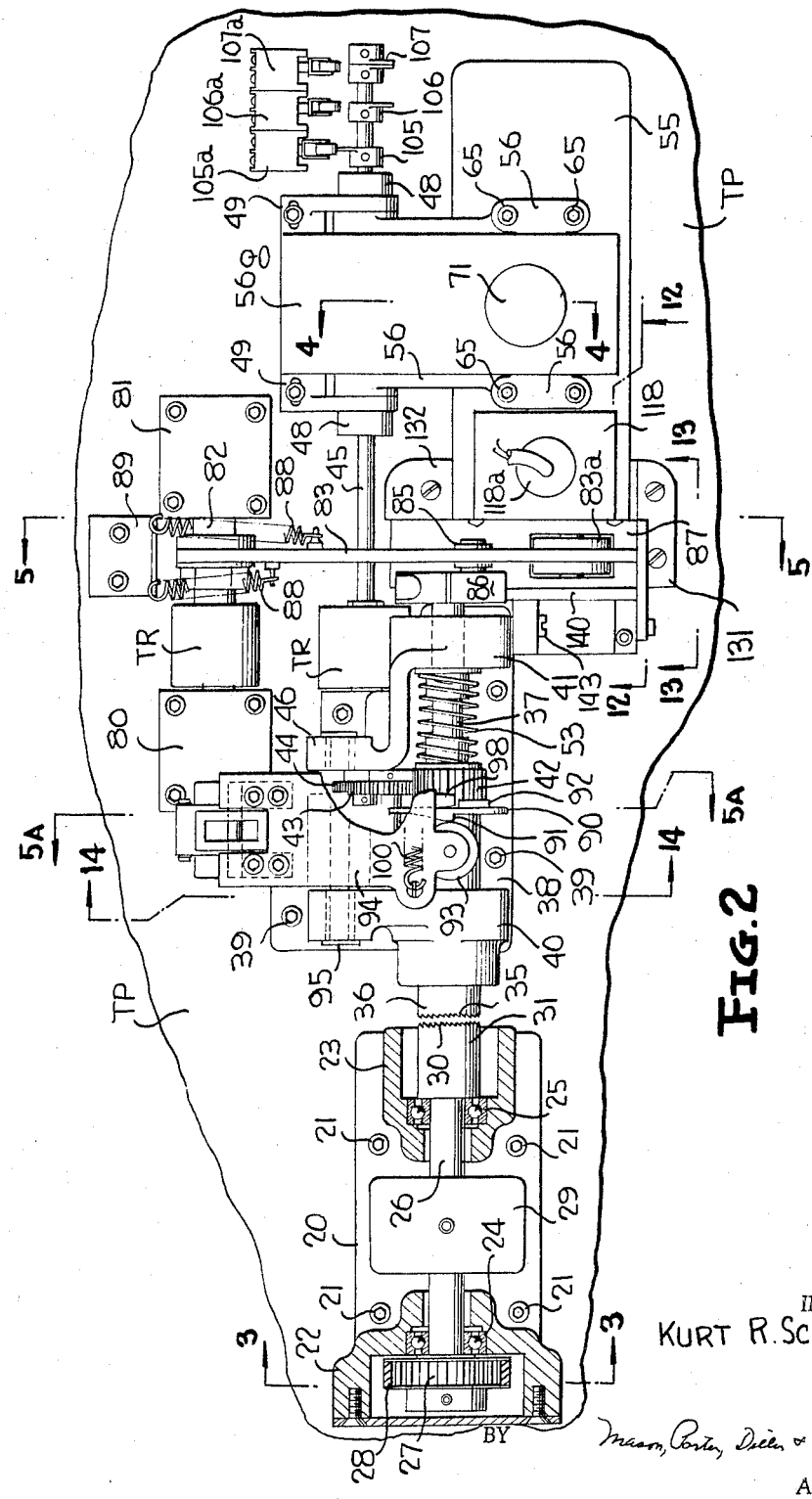
Figure 15A:
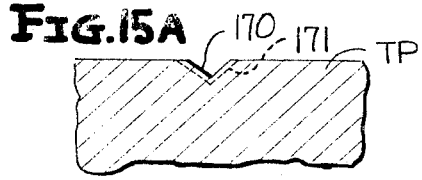
Figure 15B:
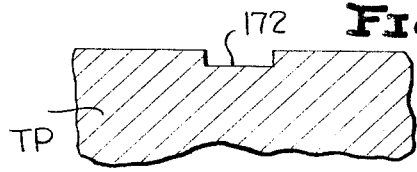
Figure 15C:
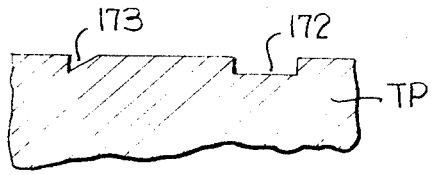
Figure 15D:
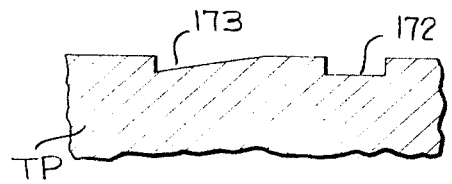
Figure 15E:
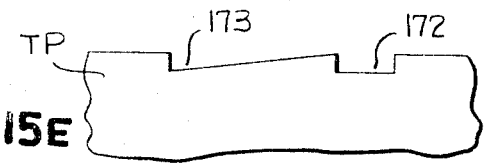
Figure 16:
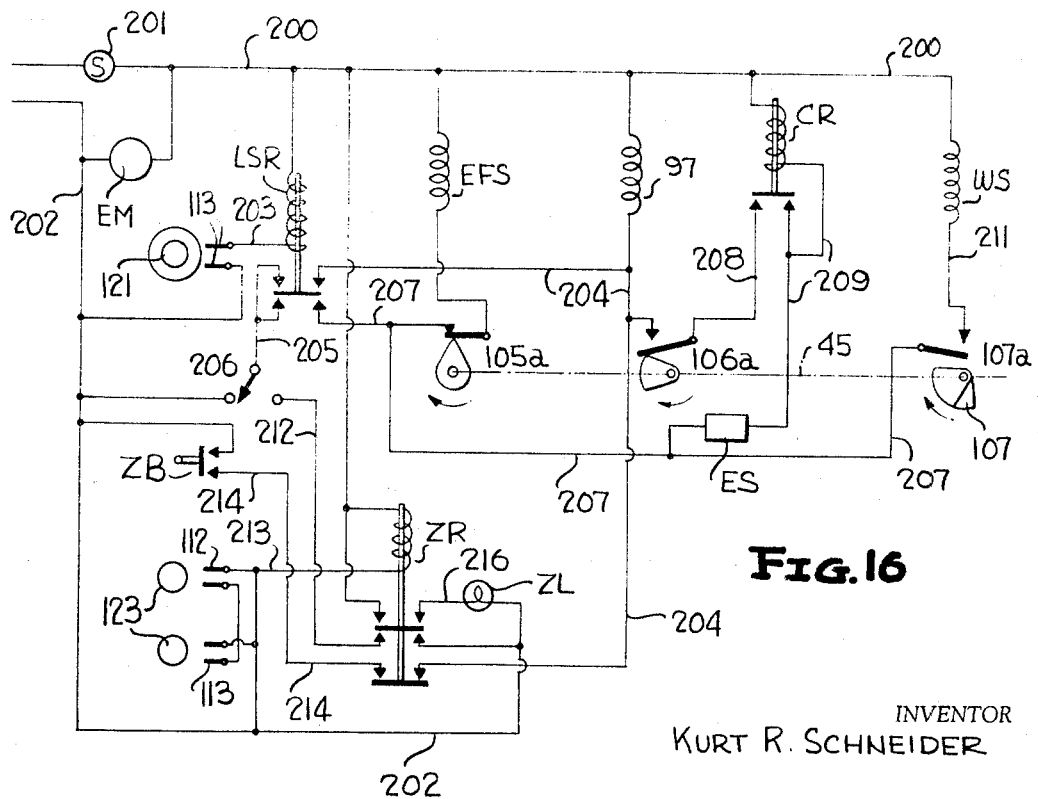

An illustrative embodiment of the invention is shown on the accompanying drawings, in which:

FIGURE 1 is a general perspective view thereof;
FIGURE 2 is a top view of the label feeding assembly with parts omitted or broken away to show the structural relationships;
FIGURE 2A shows a part of FIGURE 2, with a cover plate removed and with parts in section;
FIGURE 3 is an upright section, on line 3—3 of FIGURE 2;
FIGURE 4 is an upright sectional view substantially on line 4—4 of FIGURE 2, with the label pressure plate in closed position;
FIGURE 4A is an upright section corresponding to FIGURE 4, with the label plate in an open position;
FIGURE 5 is an upright section substantially on line 5—5 of FIGURE 2;
FIGURE 5A is an upright section substantially on line 5A—5A of FIGURE 2.
FIGURE 6 is a top view of the label plate;
FIGURE 7 is an upright sectional view on line 7—7 of FIGURE 6;
FIGURE 8 is an end view of the label plate, with parts broken away, and with a part of the top plate shown spaced below it;
FIGURE 9 is a plan view of a three-wide label sheet;
FIGURE 10 shows a group of labels at a larger scale, as will be present when a single column is in use, with at least three labels left, and indicates the positions of the shuttle bars and knife edge;
FIGURE 11 is a perspective view showing a shuttle bar in inverted position, with the label feeding lugs thereon;
FIGURE 12 is a view substantially on broken line 12—12 of FIGURE 2 of the relationship of the label plate and punch;
FIGURE 13 is a view substantially on line 13—13 of FIGURE 2 showing a sheet control device;
FIGURE 14 is an upright section, with parts broken away, substantially on line 14—14 of FIGURE 2;
FIGURE 15 is a partial view of the top plate, to show grooves therein: and FIGURES 15A to 15E show the successive sections of the grooves at lines 15A to 15E of FIGURE 15;
FIGURE 16 is a conventionalized circuit diagram.

FIGURE 1 shows a general perspective of the machine, with a top plate TP, along which a label sheet L is to be fed in the direction of the arrow m, beneath a label pressure plate 55 and thence beneath a housing DH within which are a severing knife structure and intermittent drive as set out hereinafter. Articles, such as envelopes, post cards, and the like can be placed as a stack FS between cheek plates CP–1 and CP–2 on a rear table RT and fed forward, one at a time, in the direction of the arrow r and beneath the top plate. The means for controlling the delivery of the articles, one by one, is not shown and may be as in any of the foregoing patents. The advanced article is brought to rollers TR by which it is moved beneath the top plate TP, with temporary detention as by feed fingers EFF of FIGURE 4. As the article passes beneath the housing, a label from sheet L is severed and applied to the article. The labeled article continues in its movement and is discharged from beneath the top plate TP between rollers 200 and 201, in the direction of the arrow w. The general base housing BH encloses a driving motor and other parts as set out hereinafter. A reservoir WR, for wetting fluid to be applied to the articles in preparing them for receiving paper labels having remoistening gum thereon, is mounted above the base housing BH for delivery through a hose: the delivery is controlled by a valve actuated by solenoid WM.

The top plate TP has (FIGS. 1 and 2) a drive unit base 20 secured thereto by screws 21. Two spaced upstanding hollow portions 22, 23 on base 20 support anti-friction bearings 24, 25 for a drive shaft 26. The shaft 26 has a sprocket pulley 27 at one end for a drive cog belt 28, a flywheel 29, and clutch teeth 30 at the other end of an enlarged head 31. The belt 28 is driven from a sprocket pulley 32, FIGURE 3, on a shaft which is driven constantly during machine operation, by an electric motor EM shown conventionalized at a smaller scale. The shaft 33 is illustratively supported by brackets 32a and is, together with the pulley 32 and the motor EM, located beneath the top plate TP. Cooperative with clutch teeth 30 are clutch teeth 35 on the head 36 of a shaft 37. A second unit base 38 is secured to the top plate TP as by screws 39, and has upstanding portions 40, 41 providing journal support for the shaft 37. A wide gear 42 is secured on shaft 37 and is in mesh with a narrow idler gear 43 which in turn is in mesh with a gear 44 on the feed and timing cam shaft 45. The gears 42, 44 have the same number of teeth so one full revolution or cycle of shaft 37 is accompanied by a like full revolution of the shaft 45. The shafts 37, 45 are referred to as intermittent shafts, because their times of rotation are controlled by the clutch 30, 35. The shaft 45 is journaled in the upstanding portion 46 on the second base 38 and by anti-friction bearings 47 in sleeves 48 carried in members 49, 50 which in turn are secured to the plate TP by screws 51, 52; the members 49, 50 have slots for the stems of screws 51, 52 so that the distance between the members can be adjusted.

The shaft 37 is movable axially so the clutch teeth 35 can be engaged and disengaged with clutch teeth 30: and is normally urged toward the left in FIGURE 2 by the spring 53.

The label pressure plate 55 overlies the path of the labels along the top plate TP. A gate frame 56 (FIGS. 2A and 4 and 4A) is pivoted on the ends of sleeves 48 where these project toward one another from the members 49, 50. Endwise movement of the gate frame 56 and pressure plate 55 along the shaft 45 is prevented by engagement with the upright end faces of the members 49, 50: noting that the position relative to the aperture TA can be adjusted by releasing screws 51, 52, then moving the members 49, 50 with the gate frame 56 between them, and re-tightening the screws. Such adjustment permits determining the positions of the label plate 55 and the rocker pivot 59 relative to the severing knife 83. Screws 65 secure the gate frame 56 to the top of the pressure plate 55. A rocker 58 is pivoted at an intermediate point of its length on a substantially upright stud 59 carried by the gate frame 56. An anti-friction bearing 59a (FIGURE 4) is seated in the gate frame and on the pivot 59, the parts being held by a cap nut 59b. One end of the rocker 58 has a cam follower roller 60 which is engaged in a cam groove 61 formed in a sleeve 62 that concentrically surrounds the shaft 45 and is keyed to rotate therewith, but with permissive axial sliding on the shaft, by the pin 45a in longitudinal keyways of the sleeve (FIGURE 4). The sleeve 62 is located between and with its ends abutting the flanged bearing sleeves 62b carried by the bracket arms 62c of a pad piece 62d which has a slot 62e extending parallel to the shaft 45. A screw 62f passes through the slot and is engaged in the top plate TP. By loosening screw 62f, the bracket arms 62c with the sleeve between them may be adjusted along the length of the shaft 45 and then re-fixed by tightening the screw 62f: thereby the position of the cam track 61 in sleeve 62 may be determined relative to the pivot stud 59 for the rock lever 58 for adjustment of the end positions of the follower 60 and therewith of shuttle bars 68. The groove 61 provides an endless track in the sleeve 62 with points thereof at diametrically opposite parts of the sleeve being spaced axially by a distance corresponding to the desired label feeding movement of the cam follower 60. The other end of the rocker 58 has a roller 63 mounted at its lower surface and engaged in a slot 63a in a bridge piece 64. This slot illustratively is at right angles to the direction of the shaft 45 and the direction for label feeding. A shield plate 56g overlies the gate 56 and the rocker 58.

The label pressure plate 55 (FIGURES 4, 4A and 8) has two slots 67 which are narrower at the bottom than the top, with intermediate shoulders. Shuttle bars 68 of T-shaped section can move from right to left (FIGURES 2A and 6) in the slots 67. The lateral projections 68d of the shuttle bars have a lesser vertical dimension (FIGURES 4 and 4A) than the lateral recesses at the tops of the grooves 67 in the pressure plate, so that the shuttle bars may move upwardly and downwardly in the grooves. The shuttle bars 68 are secured to the bridge 64 by screws 69, and have lugs 70 which can project below the bottom surface of the pressure plate 55 and into grooves provided in the upper surface of the top plate TP (FIGURES 4, 4A and 15) for engagement with the labels and advancing the same as set out hereinafter: when the pressure plate 55 is in lowered position (FIGURE 4), the lugs 70 are clear of the walls of the grooves for free movement. The individual lugs 70 are essentially triangular in section (FIGURE 11) viewed from the bottom of the pressure plate 55, and are smaller than the perforations 72 so that a position-correcting effect is exerted upon the label sheet during the feeding. Each lug has an upright edge 75 for engaging walls of the perforations, and a rearwardly sloping bottom surface 76 which terminates at the bottom surface of the shuttle bar, so the lugs slip over the sheet during the return of the shuttle bars. A knob 71 on the gate 56 holds the shield 56g in place and provides for manual rocking of the gate upward away from the top plate TP from the position of FIGURE 4 to that of FIGURE 4A for easy introduction of label sheets.

The shuttle bars 68 preferably have the lugs 70, for engaging the label sheet, spaced at distances from one another. Thus, assuming a nominal label width, between the feed perforations 72 of FIGURES 9 and 10 above a respective shuttle bar 68, of one inch, the stroke of the shuttle bars may be one and one-sixteenth inch. The members 49, 50 and 62d are adjusted so that the last lugs 70a, FIGURE 11, of the shuttle bars will advance the labels until the lugs come into the line of travel of the grooves 135 of the knife, as set out hereafter, and therewith the feed perforations 72 are presented so that the knife 83 operates along the line 73 in severing the label, FIGURE 10. As illustrated in FIGURE 11, each shuttle bar has six feed lugs 70, indicated successively as 70a, 70b, 70c, 70d, 70e, 70f from the punch or knife and toward the right hand end in FIGURES 2 and 11. It is preferred to have the lugs spaced at a greater distance along the shuttle bars than the corresponding width of the labels. Thus, with labels which are one inch wide as above, and the shuttle stroke of one and one-sixteenth inch, the lug spacing may be 1.007 inches: wherewith lugs 70a is 1.007 inches from lug 70b, 2.014 inches from lug 70c, 3.021 inches from lug 70d, so that finally lug 70a is 6.042 inches from lug 70f. This arrangement is valuable because paper and cardboard stock can change dimensions with atmospheric conditions. Thus, if the stock is dry when the perforations are formed accurately at one inch intervals, a humid atmosphere can cause expansion of one to three percent, and such expansion may not even be uniform per unit length along a column of perforations. Therewith the interval between perforations becomes greater than an inch. Under such conditions, if the lugs 70a–70f were uniformly spaced, a lug near the upstream end, say lug 70e or 70f, may engage the wall of a perforation before the downstream final lug 70a does and thereafter push the strip with a buckling between the pressure plate and the top plate until successive downstream lugs engage, and finally the lug 70a. Such buckling is minor but can lead to a retrograde dragging of the sheet as the shuttle bars return; or to a false advancement if the friction between the pressure plate and label is low, so that the last label would not be fully engaged by the lugs 70a, and therewith the knife 87 would act to sever the label along a line to the right of line 73 in FIGURE 10. By the preferred arrangement of lugs at successively greater distance, a shuttle movement greater than the maximum expanded spacing of perforations, and perforations which approximate such maximum expanded spacing, the action with a label sheet having its leading edge at the punch or knife is that the lugs 70a engage perforation walls before the engagement of upstream lugs 70b, 70c, etc. and this assures tha the severance is along line 73 through the centers of the perforations.

The stroke of the projections or lugs 70a–70f is greater than the nominal spacing of the sheet perforations, and less than twice such spacing to assure feeding by single label distances. The spacing of the projections or lugs 70a–70f in the direction of feed is more than the uniform spacing of the perforations in the sheet, and less than twice such distance. The preferred spacing is slightly greater than the maximum expanded spacing between the perforations due to moisture, heat or other cause: and for the feeding of paper sheets the distance between successive lugs is more than one-half percent greater than the nominal spacing between the perforations, and preferably less than half the difference between such perforation spacing and the stroke of the feeding device. Illustratively, the feed device has a stroke about 6 percent greater than the nominal spacing of perforations and the projection spacing about ½ to one percent greater than the perforation spacing.

When the pressure plate 55 is lowered onto a label sheet so that the leading edge of the sheet is between any two successive lugs on the shuttle bars with the shuttle bars in advanced position, the lugs which are upstream of the leading edge will move backward during the return stroke to points upstream of the first transverse row of labels, then perform a feeding movement in the next advancing stroke, and leave the label sheet in position for engagement at the same perforations by the next downstreamward lugs, and so on until the control of the label sheet is taken by the lugs 70a.

Blocks 80, 81 secured on the top plate TP support a pivot shaft 82 to which is secured a rock arm 83 having a slot 84, illustratively radially positioned relative to the axis of shaft 82, located for receiving the roller 85 on the disk 86 secured to the shaft 37: this roller being effective as a crank pin for pressing the walls of the slot 84 and producing a reciprocation of the rock arm 83. The lower edge 87 of the rock arm 83 provides a knife for severing the labels as set out hereinafter. The upward return of the knife can be assisted by springs 88, FIGURES 2 and 4, which extend from the knife to a bracket 89 fastened on top plate TP. A roller 83a is journalled in the knife assembly 83, 87; and projects below the knife for pressing a severed proper label against the passing article EA, and for pressing a severed improper label against a spring pressed counter-roller CR (FIGURE 5).

Top rollers TR (FIGURES 2, 2A and 5) can be journalled on the shafts 45, 82 for rotation thereon, being aligned with the aperture TA in the top plate TP at the labeling region, and cooperate with driven bottom rollers SR, the latter being urged upwardy by means not shown so that rollers SR can respond by downward yielding according to the thickness of the passing article.

Fixed on the shaft 37 (FIGURES 2 and 5A) is a disk 90 having at one face a hump 91 thereon with a slow rise and a quick drop: and at the other face a stop block 92. A roller 93 is journalled beneath one end of a lever 94 which is mounted intermediate its length on a pivot 95 carried by the upstanding portions 40, 41. The lever is pivotally connected at its other end to the core 96 of a solenoid 97. The lever 94 has a pivot for a rockable detent 98, which swings in a plane parallel to the axis of the shaft 37 and has a downward projection 99 for engagement by the stop block 92 and thereby determining the end of a cycle of movement of the shaft 37. A spring 100 acts to urge the detent 98 toward the disk 90 for presenting the projection 99 in the path of the block 92. The disk 90 also has a ramp 101 at the same face as the stop block: the ramp 101 being peripherally spaced from the stop block 92 by a distance for closely receiving the projection 99, whereby there is no retrograde moving of disk 90 or shaft 37 after the projection 99 has entered the space between the stop block and the ramp. The block 92 preferably extends a greater axial distance from the disk 90 than the ramp 101, so it engages and stops the projection 99 while the latter is in the axial position to which it has been moved by the ramp. A spring 103 (FIGURE 14) acts to rock the lever 94 to position with the roller 93 in the path of the hump 91 and with the detent 98 presenting its projection for engagement by the ramp 101.

The timing shaft 45 has three cams 105, 106, 107 fixed thereon for respective actuation of the switches 105a, 106a, 107a. The switch 105a controls a circuit for envelope feeding means; the switch 106a controls a holding device for the clutch system; and switch 107a controls a wetting system, noting that cam 107 preferably is adjustable in peripheral arcuate extent and that its edges can be set at selected angles on shaft 45 to control the starting and stopping of wetting during a cycle of the shaft 45.

The pressure plate 55 of this embodiment is shown in detail in FIGURES 6–8 and is illustratively of insulating material such as a stiff synthetic plastic. It is preferred to have the downstreamward bottom area 110 as a plane for close engagement with the top of the top plate TP or with labels thereon. The feeding direction for labels is from right to left in FIGURES 2, 6 and 7; and the lower surface 111 of the plate is at a slight downward slope in the direction of label movement, to facilitate the entry and passage of labels. The top surface can be a plane. Tapped holes are present for the screws 65 (FIGURES 2 and 2A). Apertures 67a extend from the top surface to the slots 67 for the shuttle bars, to provide passage for longitudinal feeding movement of the screws 69 which connect the bridge 64 and the shuttle bars 68. At the downstream delivery or left-hand end in FIGURE 7, the pressure plate has three sets, of two apertures each, for the pairs of metal contact pins 112, 113, 114 having lower ends urged downward by conductive leaf springs 115 until the lower ends of the pins can extend below the plate 55. The pins have enlargements on the upper ends to prevent downward loss of the pins when the plate is raised. The conductive springs 115 are held by individual bolts 116, and jumpers 117 lead from the respective bolts 116 to connector sleeves in a receptacle block 118. The conductive parts above the top of the plate 55 are protected by a lower inverted cup 119 of insulating material which supports the bolts 116, and by an upper inverted cup 120 which carries the block 118. Electrical circuits to the bolts 116, the springs 115 and the respective pins are made by the separable multi-pin plug 118a shown in FIGURE 8. The left-hand end 55m of the pressure plate 55 (FIGURE 7) has a sloping surface so its lower edge can be located close to the cutting edge of the knife 87. The sets of pins 112, 113, 114 and their conductors are electrically isolated from the machine frame.

In operation, the pairs of pins 112, 113, 114 have scanning functions determined by the presence or absence of a label sheet beneath them, and by conductive markings on individual labels. Cooperative with the pins 113 is a contact plate 121 flush with the top of the top plate TP, illustrated (FIGURES 8 and 15) as seated in a stationary knife blade 132 set into the top plate TP. The contact plate 121 is electrically separated from the knife and top plate by an insulating cup 122, and acts to short-circuit the pins 113 when no label material is present above the contact plate. Beneath the pairs of pins 112, 114 (FIGURE 8), insulating plates 123 are fastened flush with the upper surface of the top plate, so that no short circuiting of the pairs of pins and no passage of current therefrom to the machine frame will occur in the absence of label material beneath the pins or in the presence of non-conductive label material. When the label area has conductive markings at one or both ends, e.g., at regions 125, 125a in FIGURES 9 and 10, this marking spans a pair 112, 114 of the pins, short-circuiting them and closing a control circuit.

In practice, the labels are to be placed upon an envelope, post card, or other article so that one edge of the article is the bottom for reading. This can be accomplished by the arrangement of the articles in the stack FS of FIGURE 1, and by the coordinated orientation of the label sheet L. Depending upon the printing display on an envelope face, the bottom edge may be adjacent the cheek plate CP–1 or cheek plate CP–2; and such relative reversal is coordinated by feeding the label sheet L of FIGURE 9 with its edge LE–1 or LE–2 as the leading edge beneath the pressure plate 55. When the sheet is placed so that the feeding is in the direction of the arrow $m$ in FIGURE 10, the conductive area 125 will encounter the contact pins 112 of FIGURES 6–8 and short-circuit them. When the sheet is turned end for end for feeding, the conductive area will be adjacent the other edge of a column of labels, as indicated at 125a in FIGURE 10, and then serves to short-circuit the contact pins 114 of FIGURES 6–8.

In FIGURE 10, the left-hand label area LX–1 is shown as overlying the plates 121, 123 and thus being between such areas and the respective overlying sets of contact pins 112, 113, 114. The labels LX–1 and LX–4 have no markings, and are herein called "proper" labels for application to articles. Label LX–2 has a marking 124 thereon, being either a perforation in the label or a conductive area applied to its upper surface, e.g., by a graphite ink or pencil; such mark having been applied to the label so that it will overlie the plate 121 when the label is advanced to sensing position. Label LX–2 is herein termed as "improper" label, because it should not be applied to an article. In practice several indentical label sheets or rolls can be prepared, and a first sheet employed for a first mailing. Normally, some of the pieces of mail matter are returned, e.g., being stamped "Unknown," "Moved," etc., and some prospective customers may answer this first mailing: in such cases, it is undersirable to send the later mailings to such addresses. The mailing operator prevents such mailings by applying a marking 124 to each such label in all of the sheets prepared for later mailings. Such "improper" marking can also be applied when there is an error in typing the address, etc. upon a label area. It is frequently desirable to segregate mail matter into groups for specific "zones" or code areas: noting that postal regulations may require that such groups be tied in bundles to reduce handling and sorting. To this purpose, conductive "zone" markings 125, 125a may be applied so that these come over the plates 123 at the sensing point: as shown for label LX–3 in FIGURE 10, which can be termed a "zone marked" label. The ability to effect such automatic grouping is of particular value with rolls of labels.

The top plate TP has an aperture TA (FIGURES 2A, 4A, 5, 12 and 13) through which the labels are delivered to the passing articles. Alongside the aperture TA, the plate TP has recesses to receive stationary knife plates 131, 132 which are held by screws 133 and have their upper surfaces flush with the top of plate TP for smooth movement of labels thereover. The knife plate 132 has grooves 171 in extension of the grooves 170 in the top plate, so that the left-hand lugs 70a (FIGURE 11) can push a label into position over the aperture 130, as shown by the label La in dotted lines in FIGURE 13. To permit a timing of the shuttle bars and knife 87 so the left-hand lugs 70a (FIGURE 13) are engaged with the label while the knife descends, grooves 135 are provided in the knife, concentric with the pivot axis of the lever 83, as shown in FIGURES 2A and 5: these grooves 135 are aligned with the lines of perforations 72 (FIGURE 10) and hence do not affect the severance of the label.

As shown in FIGURE 12, the housing DH of FIGURE 1 has a wall 136 interposed between the knife and the contact cups 119, 120: this wall 136 being cut away at a level 137 to permit the pressure plate 55 to be raised for insertion of a label sheet. The opening in wall 136 is covered, when the plate 55 is lowered, by a shield 138 having an angular portion 139 fastened to the top cup 120.

The left-hand part of the knife 87 is guided by movement along the surface of a guide member 140 (FIGURES 2, 2A, 12 and 13) which may be of oil-filled porous brass or other mechanically resistant material of low friction. The guide member 140 is illustrated as fastened to a block 141 by screws 142. The block 141 is held to the upstanding portion 41 by screws 143 which pass through slots so the block 141 and member 140 can be adjusted relative to the knife 87.

When multi-column label sheets are to be fed beneath the pressure plate 55 for successive detachments of labels from the successive columns, it is preferred to exert a minor friction pressure upon the un-consumed columns during severance operations, closely adjacent the cutting edge of the fixed knife 132. This is effected (FIGURES 2A and 13) by member 145 which is pivoted at a projecting ear by pivot screw 146 to the block 141 and bears by its weight upon the unconsumed label sheet opposite the opening TA. When the operation of the knife 87 is to be closely checked or the guide member 140 adjusted, or when single-wide label sheets are used, e.g., with rolls of labels or the final column of a multi-wide sheet, the member 145 has no function, and can be rocked counterclockwise in FIGURE 13 to the dotted line position.

During the feeding of the first and second columns of labels of a three-column sheet, the feeding lugs 70a which are closest to the severing knife are effective to engage and move the successive labels, including the last label of the column, until the label is accurately positioned for the severing operation: and a like accuracy is attained for the last column of a multi-wide sheet or for a single-column label strip roll.

In mechanical operation, the shaft 26 with clutch teeth 30 is driven constantly. At the start of a cycle, the roller 93 engages the hump 91 and holds the disk 90 and the shaft 37 at a right-hand position with the clutch teeth 35 free of engagement with clutch teeth 30: the shaft 37 and associated parts are at a standstill at an initial position determined by the presence of the detent projection 99 between the stop block 32 and the ramp 101: the knife 87 is raised: the leading label of the label sheet will be assumed to be a "proper" label and to overlie the knife 131 because the prior label has just been severed, and therewith this leading label interposes between the pins 113 and the contact plate 121 so no circuit is established and, being itself insulating, it prevents short-circuiting of contact pins 112, 114 if this label has no conductive marking thereon: the cams 105, 106, 107 are in an initial position: the rocker 58 is in the extreme counterclockwise position shown in FIGURE 2A, with the shuttle bars in retracted positions so their end lugs 70a are engaged in the perforations 72 between the leading and next leading labels.

When the solenoid 97 is energized, the lever 94 is rocked, clockwise in FIGURES 4, 4A, 5 and 5A, and the roller 93 is lifted from contact with the hump 91. The spring 53 forces the shaft 37 toward the left: the clutch teeth 35 engage clutch teeth 32, and the shaft 37 is thereafter rotated clockwise in FIGURES 5 and 5A. Gears 42, 43, 44 act to turn the shaft 45 clockwise. Rotation of the sleeve 62 causes its cam groove 61 to move the rocker 58 and thereby the bridge 64 toward the left in FIGURE 2A, so that the shuttle bars 68 and their lugs feed the labels toward the left until the leading label is moved to the position La of FIGURE 12. The rotation of shaft 37 and its disk 86 causes the roller 85 to travel in the slot 84 and cause the lever 83 to rock counterclockwise (FIGURES 4, 4A, 5 and 5A) so that its knife at first rises and then descends, during the label feeding by the shuttle bars: so the label is in the position La of FIGURE 12 before it is encountered by the knife and severance occurs by cooperation of the knife 87 with the fixed knife plates 131, 132. The knife 87 and the roller 85a mounted therein then act to push the label through the opening TA and into contact with the article EA passing beneath the top plate TP and supported by the counterroller CR. The continued rotation of the shaft 45 causes the cam groove 61 to return the rocker 58 to its original position: the continued rotation of shaft 37 causes the roller 85 to raise the lever 83 to its original position. The electrical system normally effects deenergization of the solenoid 97 shortly after its energization, and the lever 94 is returned counterclockwise in FIGURES 4 and 5A so the roller 93 is brought into the path of the hump 91 and the detent 99 into the path of the ramp 101 and the stop block 98. As the shaft 37 approaches its initial position, the hump 91 engages the roller 93, and the disk 90 is forced toward the right in FIGURE 2 until the clutch teeth 35, 30 are disengaged: shortly thereafter, before the shafts have coasted to a standstill, the ramp 101 has swung the detent projection 99 away from the disk 90, and when the stop block 92 encounters the detent 99, the projection is moved by spring 100 into the space between the ramp 101 and the stop block 92, and the shafts 37 and 45 are brought to a standstill at the initial position.

When the label sheets are of paper, with a remoistening gum layer on the back, the sheets are subject to curling as the relative humidity of the atmosphere changes. The sheets are placed on the top plate with such gum layer downward, for easy delivery and adhesion to the wetted article. An originally flat sheet, when the humidity increases and water is absorbed, undergoes "wet curling" by which the gum layer expands and a curl is formed, concave upward, with the edges and corners raised above the center. When the humidity around an originally flat sheet decreases, water departs from the gum layer and "dry curling" occurs, with the sheet having a convex upward curl as the corners and edges move down. Thus the paper and gum can exhibit differential expansions and contractions, and these may differ for various points of a single sheet.

A further departure from theoretical flatness occurs when the addresses or other indicia are applied to the sheets by typing or other employments of localized impacts which deform the sheet and cause embossed elevations to appear at the other surface, here the surface having the gum thereon.

It has been found that irregular frictions between the sheet and the top and pressure plate can be overcome by allowing the pressure plate 55 to rest on the label sheet by its weight only: and that a light pressure plate is effective when the shuttle bars are mounted above the sheet and are urged downward by the weight of the bars 68 and the bridge piece 64. Therewith embossing on the bottom of the label sheet reacts against the top plate to lift the sheet into better contact with the shuttle bars and their lugs, as compared with lifting the sheet from the lugs when the bars are mounted below the sheet and in the top plate. Furthermore, the permitted independent downward movements of the plate 55 and the shuttles allow the shuttles to engage the sheet even though the label sheet is not in flat contact with the top plate at all abutment areas of the pressure plate and label sheet with the pressure plate held thereby above its lowermost position. As the shuttle bars return toward the right in FIGURES 2, 2A, 6 and 7, they tend to rise as the lugs 70 ride up out of the perforations 72, with the reaction serving to bend the label sheet downward into the grooves 170 of the top plate, therewith increasing the friction between the top plate and the label sheet and detaining the latter against retrograde movement.

The ability of the label feeding devices to advance curled or embossed labels is increased by the provision of the grooves in the top plate as shown in FIGURE 15. The grooves 171 in the knife plate 132 are slightly wider and deeper than the top plate groove portion 170 leading thereto as shown at FIGURE 15A. The several parts of the grooves are of such widths and depths that the shuttle lugs 70 do not make contact therewith. The grooves are widened at the right-hand ends of portions 170, FIGURE 15, to provide a rectangular section as at 172 in FIGURES 15B to 15E of uniform width, noting that the widening is toward the center of the width of the label column. At several label distances along the label column, separate grooves 173 are formed with bottoms inclined upward toward the center of the column width: these grooves are of successively greater depth upstreamward of the direction of label movement, as shown by FIGURES 15C to 15E, with FIGURE 15E showing the relationship of grooves at the edge of the top plate TP, where the inclined floor of groove 173 comes to the edge of the adjacent groove portion 172. It will be understood that FIGURES 15A to 15E show the relationship of the lower groove portion 172 in FIGURE 15 to its adjacent triangular groove 173: and that a like but symmetrical arrangement is present for the upper groove portion 173 of FIGURE 15.

In practice, with labels in columns about 2¾ inches wide, the grooves 170, 171, 172 can be $\frac{1}{16}$ inch deep, with the grooves 172 about ⅜ inch wide and spaced 1½ inches apart when the perforations 72 of the label sheet are spaced 2⅙ inches on centers. The grooves 135, 170, 171 are narrower than the longer dimension of the perforations 72 in the label sheets, so that a clean severance of the sheet is effected by the knife. The triangular grooves 173 are $\frac{1}{16}$ inch deep at the edge of the top plate (FIGURE 15E) and extend about 4½ inches from such edge toward the cutting edge of the knife plate 131. The side edges of the grooves 172 extend about 5½ inches toward the knife edge, and there the outer side edges join the edges of the grooves 170. The knife edge can be about 8 inches from the edge of the top plate TP, for such labels of a nominal size of one inch by 2¾ inches, as set out above.

It will be noted that single and multi-column label sheets can be employed with different column widths on the illustrative machine, so long as the spacing of the perforations 72 therein from one another corresponds to the spacing of grooves 135 on the knife.

The lugs 70 travel in the groove portions 170, 171, 172; wherewith the label sheet is supported by the top plate close to the lugs 70a, 70b, but at greater distance at the groove portions 172 and thus can be bent downwardly a greater distance into such portions. The grooves 173 receive curled edges of the label sheet, and effect a correction thereof toward flatness beneath the pressure plate 55 as the label sheet moves toward the knife edge.

For completeness of disclosure as to feasible connection of parts, illustrative electrical connections are set out below, noting that certain phases thereof are described and claimed in granted patents and copending applications.

For operation, it will be assumed that the switch 201 is open, FIGURE 16, with motor EM at a standstill. The clutch 30, 35 is open, and the intermittent shafts 37, 45 at standstill with stop 99 holding them at initial position. A sheet L of labels has been introduced so that its left-hand or leading edge is beneath the label plate 55 ready to be engaged and advanced by shuttle bars 68, but not overlying the knife plate 132. A stack FS of articles, shown as envelopes, is present on table RT and held by cheek plates CP–1 and CP–2 in alignment to be fed beneath the top plate TP and to the punch, but with the lowermost article being detained by the feed fingers EFF (FIGURE 4). Cam switch 105a has been closed at the end of the preceding cycle: cam switches 106a and 107a are open. The contact pins 113 engage the plate 121 and are thus electrically connected or short-circuited to one another. The sets of contact pins 112, 114 rest on the insulation pieces 123. It will be assumed that "zone" markings are not being employed, for setting out the circuits by which a succession of articles are being labeled; and that switch 206 connects conductor 205 directly to the return conductor 202, as shown.

When switch 201 is closed, current flows by the path 200–EM–202. The motor EM runs, and the feed rollers SR are driven so an article can be fed when released by feed fingers EFF; and the shaft 26 is driven.

(a) If no label is present between the contact pins 113 and the shorting plate 121, pins 113 are connected electrically and current can flow by the path 200–LSR–203–113–121–113–202. The bridge of label relay LSR is lifted.

(b) Current can then flow by the path 200–97–204–bridge of LSR–205–206–202. Clutch solenoid 97 is energized; the roller 93 and stop 99 are lifted; shaft 37 is moved to the left by spring 53 and the clutch teeth 35, 30 engage: the intermittently driven shafts 37, 45 begin turning. The cycles of shafts 37, 45 continue and the label sheet is advanced by the shuttle bars 68 until a "proper" label is beneath the pins 113 at the end of a cycle: whereupon circuit (a) is broken, the bridge of relay LSR drops, the solenoid 97 is de-energized, and the clutch can open at the end of the cycle.

(c) When an "improper" label, with a central hole therein at 124, comes beneath the pins 113, these are shorted by the plate 121, and the same circuits act as in (a) and (b), until a "proper" label is sensed. The same occurs if the coding is by a conductive area 124 instead of a hole.

(d) When the relay LSR is energized and its bridge raised, no article is fed and the wetting solenoid WS is not energized, because the conductor 207 is not connected to the return 202.

(e) When a "proper" label is beneath the pins 113 at the close of a clutch cycle, the paper of the label operates as an insulator and the pins 113 are open-circuited. The bridge of relay LSR drops. Current flows by the path 200–EFS-cam switch 105a–207-bridge of LSR–205–206–202. Solenoid EFS retracts the feed fingers EFF and an article is fed to and by rollers SR, and thus past the label applying region. Overlying articles are detained, e.g., by means set out in aforesaid patents.

(f) When the leading edge of the article encounters and closes the switch ES, current flows by the path 200–97–204-cam switch 106a–208-bridge of relay CR–209–ES–207–LSR–205–206–202: noting that cam switch 106a has been closed at the beginning of cycle. The clutch solenoid 97 is energized; a cycle starts during which such "proper" label is severed and applied to the passing article. The cam switch 106a opens during the course of the cycle, and solenoid 97 is deenergized so the clutch can open at the end of the cycle.

(g) Advancement of the label which has just been scanned or sensed at the pins 113 causes another label to be brought beneath the pins 113 before the end of the cycle. If there are no more labels on the strip, the action of (a) begins and continues until a new strip is introduced and advanced to position for scanning by the contacts 112, 113, 114. If this new label is "improper," closure at pins 113 causes the effects of (a), (b), (c) and (d) above. If a "proper" label is presented at pins 113, when the article releases switch ES during the course of a cycle, the series circuit through ES and 97 is open at switch ES until this is closed by the next article: whereupon (e) and (f) are repeated.

(h) If the article is so long that it does not release ES before the cam switch 106a opens during the cycle, wherewith the clutch solenoid 97 would continue energized, a false second cycle could occur, possibly with application of a second label to the article. To prevent this, means can be provided to deenergize the solenoid 97 so long as switch ES is closed. For this, a relay CR can be employed, which drops its bridge promptly when the coil is deenergized. Current flows by the path 200–CR–209 for as long as switch ES is closed, and the bridge of relay CR then opens the clutch solenoid circuit shortly after this circuit has been closed by the path (f) above. Therewith the clutch solenoid releases the clutch latch shortly after the cycle starts, independently of the action of cam switch 106a. The cycle ends with the cam switch 106a open but the circuit through it to solenoid 97 is also open at the bridge of relay CR so long as switch ES is closed. When the long article releases switch ES, it opens and the maintaining circuit 200–CR–209–ES is opened and relay CR reestablishes the connection between conductors 208 and 209: the cam switch 106a is then open, and no re-energization of the clutch solenoid through it can occur until a "proper" label is present.

(i) Wetting is only produced when an article is passing. The presence of a "proper" label causes dropping of relay LSR as in (e), wherewith EFS is energized to release an article, and this article then engages switch ES to start a cycle as in (f). Current can flow by the path 200–WS–211-cam switch 107a–207-bridge of relay LSR–205–206–202 at the time and for the duration determined by the adjustable cam 107 of switch 107a.

(j) When "zone" markings such as 125, 125a in FIGURE 10 are on certain labels, and are to be employed for indicating the end of the "zone" group, the switch 206 is shifted so that conductor 205 is connected to conductor 212 and thus to a contact for the bridge of the zone relay ZR, the return then occurring from another bridge contact to conductor 202. When either or both of the contact pins 112, 114 are short-circuited by conductive markings 125, 125a, a circuit is closed by the path 200–ZR–213–112 or 114 pins –202. Relay ZR lifts its bridge, and all above circuits which include conductor 205 are opened: no clutch cycles of label feeding, and no article feeding can then occur. The relay ZR is preferably provided with contacts which are normally open, but are closed when relay ZR is energized: so that the action of the "zone" marking in actuating relay ZR to stop label and article feeding is signaled by the circuit 200-bridge of relay ZR–216-signal lamp ZL–202. The attendant can then remove the stack of labelled articles constituting the group. When the manual switch ZB is pressed with the relay ZR energized and its bridge lifted, current flows by the path 200–97–204-bridge of relay ZR–214–ZB–202; and the clutch acts to procure a cycle during which the "zone" marked label is advanced to the punch and discharged. As this label carries its conductive portion 125 and 125a away from the contact pins 112, 114, current ceases to flow in conductor 213 and relay ZR drops its bridge, therewith opening the last above path through clutch solenoid 97 and switch ZB, so the clutch can open at the end of the cycle. The other bridge of relay ZR closes the circuit from 212 to 202, and normal operations are resumed, until a further "zone" marked label is detected.

It will be understood that the illustrative embodiment is not restrictive, and that the invention may be practiced in many ways within the scope of the appended claims.

What is claimed is:

1. An apparatus for feeding sheets comprising a plate along which the sheet is to be fed, a guide structure having a surface for urging the sheet toward the plate, a member mounted on and movable along the guide structure for engaging and feeding the sheet toward an edge of the plate, said member being movable in the guide structure toward and from the plate and being urged toward the plate, and means carried by the guide structure for moving said member and advancing said sheet, said means including a first part engaged with said member and a second part carried by the plate permitting the said movement toward and from the plate.

2. An apparatus as in claim 1 for sheets having perforations therein at intervals in the direction of feeding, said member having a plurality of lugs thereon for engaging in said perforations, the lugs being spaced at a greater distance than the distance between successive perforations.

3. An apparatus as in claim 1 in which the plate is horizontal and the surface is that at the top of the plate, and in which the guide structure is mounted above the plate, whereby said member is urged downwardly by gravity.

4. An apparatus as in claim 1 for feeding a sheet having perforations spaced along the direction of feed, in which the plate is horizontal and the sheet is to be fed along the top thereof, the guide surface being located above the plate and held against the sheet by the weight of the guide structure parts, said member being urged downwardly in the guide structure by gravity and having a projection for extending beyond the guide surface to engage in said perforations, said plate having a groove in its upper surface for receiving said projection and permitting free feeding movement thereof.

5. An apparatus for feeding sheets having perforations therein spaced uniformly in the direction of feed, comprising a plate along which the sheet is to be fed, a guide structure having a surface for urging the sheet toward the plate, a member mounted on and movable along the guide structure for engaging and feeding the sheet toward an edge of the plate, said member being movable in the guide structure toward and from the plate and being urged toward the plate, means carried by the guide structure for moving said member and thereby feeding said sheet, said moving means including a part engaged with said member and permitting the said movement toward and from the plate, and a plurality of projections on said member for engagement in the perforations, said projections being spaced apart along the direction of feed a greater distance than the spacing of the perforations and less than twice said spacing.

6. An apparatus as in claim 5, in which the said moving means has a stroke greater than the spacing of the perforations and less than twice such perforation spacing, and the spacing of the projections is less than the stroke of the moving means.

7. An apparatus as in claim 6, in which the stroke of the moving means is about 6 percent greater than the perforation spacing and the projection spacing is ½ to one percent greater than the perforation spacing.

8. An apparatus for feeding sheets subject to curling, comprising a plate along which the sheet is to be fed, a guide structure having a surface for urging the sheet toward the plate, a member mounted on and movable along the guide structure for engaging and feeding the sheet toward an edge of the plate, said member being movable in the guide structure toward and away from the plate and being urged toward the plate, and means carried by the guide structure for moving said member and advancing said sheet, said means including a part engaged with said member and permitting the said movement toward and from the plate; in which the plate has a groove for receiving an edge of a curled sheet, said groove extending in the feed direction and having a decreasing depth in such direction.

9. An apparatus as in claim 8 in which the plate has spaced parallel grooves extending in and of decreasing depth and width in the feed direction.

10. An apparatus comprising a plate along which the sheet is to be fed, a guide structure having a surface for urging the sheet toward the plate, a member mounted on and movable along the guide structure for engaging and feeding the sheet toward an edge of the plate, said member being movable in the guide structure toward and from the plate and being urged toward the plate, and means carried by the guide structure for moving said member and advancing said sheet, said means including a part engaged with said member and permitting the said movement toward and from the plate; in which the plate is horizontal and the sheet is to be fed along the top thereof, the guide surface being located above the plate and held against the sheet by the weight of guide structure parts, said member being urged downward in the guide structure by gravity to engage the sheet for moving the same and being raised against gravity for moving along the upper surface of the sheet during a return stroke while the sheet is being detained by the guide structure, the plate having spaced parallel grooves extending in the feed direction for receiving the edges of a concave downwardly curled sheet, said grooves having a decreasing depth in the feed direction and terminating short of said edge.

11. A sheet feeding apparatus for feeding sheets of labels comprising a plate along which the sheet is to be fed, a guide structure having a surface for urging the sheet against the plate, feed devices for feeding the sheet, said feed devices including a member mounted on and movable in the feed direction along the guide structure and having a part for engaging the sheet, and means for moving said member, said label plate being horizontal and the sheet being adapted to be fed along its upper surface, said guide structure being pivotally mounted above the label plate and having a guide plate providing said guide surface for engaging and urging said sheet, a label sensor device mounted on the label plate, said feed devices including a shaft journaled on and located above said label plate, a cam on said shaft a cam follower actuated by the cam and connected for moving said member, and means controlled by said sensor device for producing movement of said shaft during the absence of a label proper for employment and for causing stoppage of the shaft when a proper label is present at the sensor device.

12. A sheet feeding apparatus comprising a plate along which the sheet is to be fed, a guide structure having a surface for holding the sheet against the plate and being pivoted for movement from the plate about an axis parallel to the direction of sheet feeding, feed devices carried by the guide structure for feeding the sheet, a cam and means to move the same, a cam follower structure engaged by the cam and connected to the feed devices for reciprocating the same.

13. An apparatus according to claim 12, in which the support has a horizontal surface for the sheet and the guide structure comprises a plate located above said surface, and in which the feed devices comprise shuttle bars having sheet engaging portions, said bars being mounted in the plate for the reciprocating motion and having a permissive upward and gravitational downward movement in the plate.

14. An apparatus according to claim 13, in which the feed devices include a member connected to the shuttle bars and extending above the plate and having a slot therein at right angles to the direction of the reciprocating motion, and in which the cam follower structure includes a rock lever pivoted on the guide structure with one end having a part engaged with the cam and at the other end engaged in the said spot.

15. An apparatus as in claim 12 in which the means to move the cam is a shaft extending parallel to the direction of sheet feeding and the cam is mounted thereon, said guide structure being pivoted to swing about the axis of the shaft.

16. An apparatus according to claim 12 for feeding a perforated sheet, in which the driving means includes a shaft and the rotatable cam is mounted to rotate with and be slidable along the shaft, said guide structure including a member pivoted to rock about the axis of the shaft and a plate secured on said member in spaced relation to the support so that the sheet may move therebetween, said feed devices including a reciprocating shuttle bar guidedly located on the guide structure and having a lug for engaging in the perforations of the sheet, and a member connected to the shuttle bar and extending through the plate for engagement by said cam follower element.

17. An apparatus according to claim 16, in which a plurality of said shuttle bars are provided in spaced relation, and in which said member is fixedly connected to said shuttle bars and positioned for actuation by said cam follower element.

18. An apparatus having a support plate along the upper surface of which a label sheet may be fed, a pressure plate for holding the sheet against said surface, a reciprocating member carried by the pressure plate and extending below the same for feeding the sheet, a shaft extending in the direction of sheet feeding, a cam on the shaft, means supporting the pressure plate for rocking about the axis of the shaft, a rocker pivoted on the pressure plate, said rocker having thereon a follower engaged with the cam and having a part engaged with the reciprocating member for moving the same during rotation of the cam, whereby the cam follower remains engaged with the cam rocked positions of the pressure plate, said cam being movable along the shaft and connected to rotate therewith, and means on the support plate to fix the axial position of the cam on the shaft whereby to vary the position of the stroke of the reciprocating member relative to the ends of the pressure plate.

19. An apparatus for feeding multi-column sheets of labels having perforations located at the boundaries of label areas and spaced in the direction of sheet feeding, comprising a plate along which the sheet is to be fed and having edges defining lines along which a label is to be severed and a guide structure movable toward and away from said plate and having a surface for urging the sheet toward the plate, a member mounted within and having portions movable relative to and adjacent said guide structure surface for engaging the perforations and feeding the sheet, said member being movable in the guide structure toward and from the plate whereby during its return stroke it can pass the sheet, a knife cooperative with said edges for severing a label from the sheet, means carried by the guide structure for moving said member by strokes greater than the perforation spacings and effective to feed the sheet until a label is presented at said edges for severance, and a friction device located adjacent said edges for engaging a part of the sheet other than that occupied by the label to be severed and effective to detain the sheet during the severance by said knife.

20. An apparatus having a support including a plate along the upper surface of which a label sheet may be fed, a pressure plate for holding the sheet against said surface, a reciprocating structure carried by the pressure plate for feeding the sheet, a first shaft extending in the direction of sheet feeding, said support plate having an aperture to which the sheet is fed, a knife movable in a plane transverse to the feed direction for severing an end from the sheet and delivering the severed end through the aperture, means including said shaft for actuating the reciprocating structure and the knife, pivot means for supporting the pressure plate, and means for adjustably securing said pivot means at a selected position along the length of shaft relative to the knife.

21. An apparatus as in claim 20, in which the pivot means for the pressure plate includes arms spaced along the shaft and mounted for movement about the axis thereof, a cam mounted on the shaft between the arms for rotation with the shaft and movable axially therealong, said cam having a peripheral groove with parts of the groove spaced along the axis of the shaft, said actuating means including an element having a part engaged in said groove and a part connected to the reciprocating structure, and means on the support for fixing the position of the cam relative to the aperture whereby to fix the stroke and positions of the reciprocating structure relative to said knife.

22. An apparatus as in claim 20, in which the actuating means includes a rocker pivotally mounted on said pressure plate, and in which the reciprocating structure has a driving surface in a plane transverse to the feeding direction, said rocker being in engagement with said driving surface.

23. An apparatus as in claim 20, including a pivot shaft on the support parallel to said first shaft, said knife being mounted on the pivot shaft for reciprocation to effect the severance and delivery, a second shaft on the support parallel to the said first shaft, means on the second shaft for reciprocating the knife, and means for coordinating the rotations of said first and second shafts.

24. A sheet feeding and cutting apparatus comprising a support along which the sheet is fed, a knife for cutting off a fed portion of the sheet, a guide structure having a surface for holding the sheet against the support, reciprocating feed devices carried at least partially within the guide structure and at least partially adjacent said guide structure surface for advancing the sheet, a rotatable cam, driving means including parts for rotating the knife in timed sequence, a cam follower engaged by the cam and mounted on the guide structure, and an element on the cam follower for reciprocating the feed devices; said guide structure being movable toward and from the support.

25. An apparatus comprising a support having a support plate with a surface along which a sheet is to be fed for severance, a guide structure including a pressure plate movable toward and from said support for holding the sheet against said surface, means on the pressure plate for moving the sheet along the surface and past an edge thereof, a lever pivoted on the support, a knife on said lever cooperative with said edge for severing the extended end of the sheet, a cyclically driven member and means for controlling the initiation of cycles thereof, means actuated by said member for successively procuring movement of said sheet moving means and thereafter severing movement of the knife.

26. An apparatus comprising a support having a support plate with a surface along which the sheet is to be fed for severance, a pressure plate for holding the sheet against said surface, means on the pressure plate for moving the sheet along the surface and past an edge thereof, a lever pivoted on the support, a knife on said lever cooperative with said edge for severing the extended end of the sheet, a cyclically driven member and means for controlling the initiation of cycles thereof, means actuated by said member for successively procuring movement of said sheet moving means and thereafter severing movement of the knife, wherein a guide member is mounted on the support parallel to and spaced from said edge, and the knife is guided by and can react against said guide member during the severing movement.

27. An apparatus as in claim 26, in which the guide member is carried by a block, and means on the support are provided for moving the block to and its fixing at a selected distance from the said edge.

28. An apparatus comprising a support having a support plate with a surface along which a sheet is to be fed for severance, said support having an aperture through which a severed end of the sheet is to be delivered, a pressure plate for holding the sheet against said surface, means on the pressure plate for moving the sheet toward the aperture so its end extends over the aperture, a lever pivoted on the support so its free end moves toward and from the aperture, a knife on said lever cooperative with an edge of the aperture for severing the extended end of the sheet, a roller mounted on the lever for movement into the aperture during the cutting stroke of the knife, and a driven roller mounted opposite the aperture for receiving the severed end and cooperative with the lever-mounted roller for moving the severed end from the aperture.

29. An apparatus according to claim 28, in which the lever is pivoted on a shaft on the support, and in which an article is to be moved along the support plate at the side opposite said surface, and including a roller mounted on and rotatable about the axis of said pivot shaft and extending through the plate for engaging the article, a cooperative roller located beneath said shaft-mounted roller, and a bearing on said support for said cooperative roller.

References Cited by the Examiner

UNITED STATES PATENTS

| | | | |
|---|---|---|---|
| 1,966,903 | 7/1934 | Piepenbring et al. | 83—278X |
| 1,986,678 | 1/1935 | Laencher | 226—67 |
| 2,720,994 | 10/1955 | Arvidson | 83—278 X |
| 2,721,612 | 10/1955 | Almgren | 83—278 X |
| 3,143,310 | 8/1964 | Norden | 226—67X |

WILLIAM W. DYER, Jr., *Primary Examiner.*

L. B. TAYLOR, *Assistant Examiner.*